United States Patent
Moe et al.

(10) Patent No.: US 7,868,620 B2
(45) Date of Patent: Jan. 11, 2011

(54) DATA INTEGRITY MANAGEMENT RESPONSIVE TO AN ELECTROSTATIC EVENT

(75) Inventors: Hla Moe, Singapore (SG); James Lai Kein Chang, Singapore (SG); Yu Nang Zai, Singapore (SG); Pei Koh Lee, Singapore (SG); Lucas Kong Yaw Lee, Singapore (SG); Boon Liong Tan, Singapore (SG)

(73) Assignee: Seagate Technology LLC, Scotts Valley, CA (US)

( * ) Notice: Subject to any disclaimer, the term of this patent is extended or adjusted under 35 U.S.C. 154(b) by 262 days.

(21) Appl. No.: 11/847,138

(22) Filed: Aug. 29, 2007

(65) Prior Publication Data

US 2009/0059440 A1    Mar. 5, 2009

(51) Int. Cl.
*G01R 29/12* (2006.01)
*G11C 29/00* (2006.01)

(52) U.S. Cl. .................. 324/452; 324/457; 365/201

(58) Field of Classification Search ............... 324/452, 324/457; 365/201; 714/721, 745
See application file for complete search history.

(56) References Cited

U.S. PATENT DOCUMENTS

| | | | |
|---|---|---|---|
| 5,255,146 A | 10/1993 | Miller | |
| 5,315,255 A | 5/1994 | Bettinger | |
| 5,359,319 A * | 10/1994 | Campbell et al. | 340/649 |
| 5,448,433 A | 9/1995 | Morehouse et al. | |
| 5,515,303 A | 5/1996 | Cargin, Jr. et al. | |
| 5,774,291 A | 6/1998 | Contreras et al. | |
| 6,023,147 A | 2/2000 | Cargin, Jr. et al. | |
| 6,249,410 B1 | 6/2001 | Ker et al. | |
| 6,259,573 B1 | 7/2001 | Tsuwako et al. | |
| 6,465,848 B2 | 10/2002 | Ker et al. | |
| 6,498,747 B1 * | 12/2002 | Gogl et al. | 365/158 |
| 6,510,987 B1 * | 1/2003 | Hengriprasopchoke et al. | 235/380 |
| 6,614,235 B2 * | 9/2003 | Kraz | 324/457 |
| 6,724,603 B2 | 4/2004 | Miller et al. | |
| 6,809,522 B2 * | 10/2004 | Nguyen | 324/457 |
| 6,895,419 B1 * | 5/2005 | Cargin et al. | 708/131 |
| 7,005,858 B1 | 2/2006 | Luo | |
| 7,110,229 B2 | 9/2006 | Yang et al. | |
| 7,142,400 B1 * | 11/2006 | Williams et al. | 361/18 |
| 7,164,565 B2 | 1/2007 | Takeda | |

(Continued)

OTHER PUBLICATIONS

Ker, Ming Dou et al. "Design on Power-Rail ESD Clamp Circuit for 3,3-V I/O Interface by Using Only 1-V/2.5-V Low-Voltage Devices in a 130-NM CMOS Process", IEEE Transactions on Circuits and Systems-I: Regular Papers, vol. 53, No, 10, Oct. 2006, pp. 2187-2193.

(Continued)

*Primary Examiner*—Timothy J Dole
*Assistant Examiner*—Farhana Hoque
(74) *Attorney, Agent, or Firm*—Theodore M. Magee; Westman, Champlin & Kelly, P.A.

(57) ABSTRACT

The disclosure is related to detecting an electrostatic charge at a data storage device. The electrostatic charge can be detected and a data integrity management process can be implemented. In a particular embodiment, a method includes monitoring an electronic device having a data storage medium for an electrostatic event. The method also includes selectively performing a data integrity management process on the data storage medium when the electrostatic event is detected.

13 Claims, 6 Drawing Sheets

U.S. PATENT DOCUMENTS

| | | |
|---|---|---|
| 7,236,334 B2 | 6/2007 | Ding et al. |
| 7,365,573 B2 * | 4/2008 | Okada .................. 326/86 |
| 2002/0097532 A1 | 7/2002 | Voldman |
| 2004/0093363 A1 | 5/2004 | Cargin, Jr. et al. |
| 2005/0030042 A1 * | 2/2005 | Walker et al. .............. 324/452 |
| 2005/0087603 A1 | 4/2005 | Koenck et al. |
| 2006/0123280 A1 * | 6/2006 | Tran et al. .................. 714/718 |
| 2006/0198227 A1 | 9/2006 | Okada |

OTHER PUBLICATIONS

"Application Note: ESD Compliance Testing and Recommended Protection Circuits for GaAs Devices", Skyworks Solutions, Inc., Sep. 15, 2004, pp. 1-4.

"Application Note 654: New RS-232 ICs Feature I µA Supply Current, ±15kV ESD Protection, and 3V Operation", Maxim Integrated Products, Mar. 31, 2000, 9 pgs.

Steinman, Arnie et al. "Detecting ESD Events in Automated Processing Equipment", www.ce-mag.com, Sep./Oct. 2000, 12 pgs.

"Texas Instruments High Performance Analog Connection eNewsletter", Texas Instruments Incorporated, http://focus.ti.com, Sep. 2005, 10 pgs.

Allan, Roger et al. "Components: Circuit Protectors & Sensors", www.elecdesign.com, Jan. 7, 2002, pp. 1-3.

ESDALC6V1Px Product Data Sheet, STMicroelectronics, Inc., www.st.com, Oct. 2006, pp. 1-9.

\* cited by examiner

DATA INTEGRITY MANAGEMENT RESPONSIVE TO AN ELECTROSTATIC EVENT

BACKGROUND

The present disclosure relates generally to data integrity management responsive to an electrostatic event. An electrostatic discharge (ESD) event may damage or degrade an electronic device if a large amount of current generated by the ESD flows through an unintended path of the device. As electronic devices become faster and smaller, their susceptibility to ESD can increase. ESD may impact productivity and product reliability in virtually every aspect of today's electronics environment, especially in hand-held systems such as mobile phones and portable music players because a human body is a source of ESD.

Particularly, ESD can be detrimental to data storage devices. An electrostatic charge can build up on a chassis of a data storage device and the consequent discharge may go through an undesired path, such as through a printed circuit board assembly (PCBA) or a head disc assembly (HDA), instead of from the chassis to earth ground. These undesirable paths of ESD can deteriorate the data storage device performance. For example, during a write mode in a disc drive, ESD can cause on-track and/or off-track errors. Further, ESD can introduce latent damage into a data storage device that may not be detected until the data storage device is provided to an end user. Also, an ESD event may occur when the data storage device is no longer in the care of the manufacturer, such as during use by an end user.

Therefore, there is a need for an improved system and method of detecting an electrostatic event at a data storage device.

SUMMARY

The disclosure is related to data integrity management responsive to an electrostatic event. The electrostatic event can be detected and a data integrity management process can be implemented.

In a particular embodiment, a method includes monitoring an electronic device having a data storage medium for an electrostatic event. The method also includes selectively performing a data integrity management process on the data storage medium when the electrostatic event is detected.

In another particular embodiment, a device includes an electrostatic charge detection circuit and a memory. The device also includes a controller operably coupled to the memory and the electrostatic charge detection circuit. The controller is operable to selectively initiate a data integrity management process on the memory when an electrostatic event is detected.

In yet another particular embodiment, a device includes a data storage medium and means for detecting an electrostatic event. The device also includes means for implementing a data integrity management process on the data storage medium based on the electrostatic event.

DETAILED DESCRIPTION

In the following detailed description of the embodiments, reference is made to the accompanying drawings which form a part hereof and in which are shown by way of illustration of specific embodiments. It is to be understood that other embodiments may be utilized and structural changes may be made without departing from the scope of the present invention.

Figure 1:
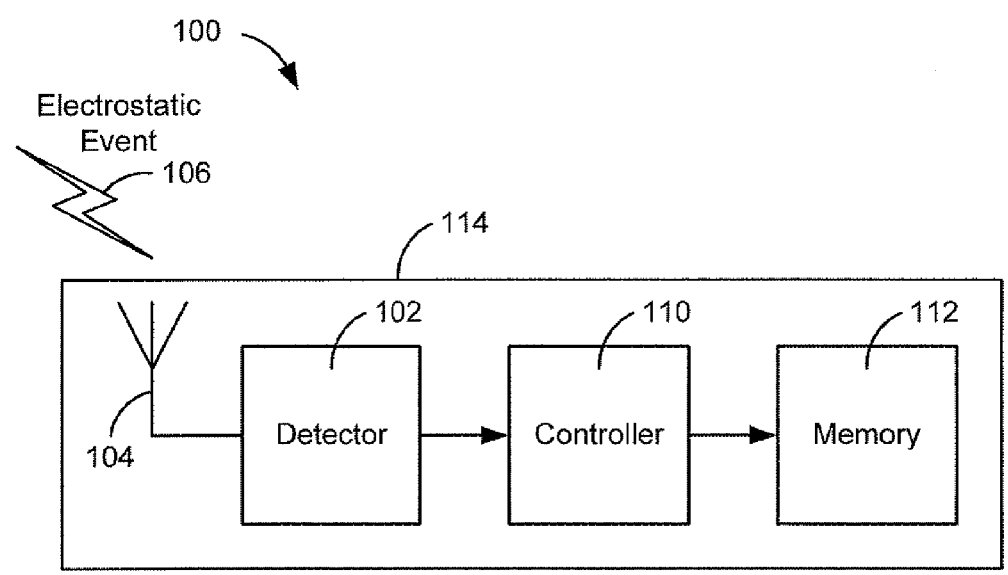
FIG. 1 is a particular illustrative embodiment of a system for data integrity management responsive to an electrostatic event.

Referring to FIG. 1, a particular illustrative embodiment of a system for detecting an electrostatic event at a data storage device is disclosed and generally designated 100. The system 100 includes an antenna 104 coupled to an electrostatic event detector 102. The system can also include a controller 110 coupled to the electrostatic event detector 102 and a memory 112. In a particular embodiment, the memory 112 may comprise solid state memory. In yet another particular embodiment, the memory 112 may comprise memory selected from the group of magnetic memory, solid state memory, optical memory, magneto-optical memory, any other type of memory, or any combination thereof.

In a particular embodiment, the antenna 104, the electrostatic event detector 102, the controller 110, and the memory 112 are located within or about a single housing 114. In another particular embodiment, the single housing 114 can comprise a hand-held device such as a hand-held computer, a cellular phone, a portable music player, or a personal digital assistant (PDA). In yet another particular embodiment, the single housing can comprise a data storage device, such as a disc drive or a solid-state storage device.

In a particular embodiment, the electrostatic event detector 102 may be any type of electrostatic charge detection circuit. An electrostatic charge detection circuit may detect a build-up of electrostatic charge or an electrostatic discharge (i.e. ESD). In another particular embodiment, the memory 112 may be a magnetic memory such as a magnetic disc, magnetic tape, or a magnetic solid-state device (e.g. magnetoresistive random access memory (MRAM)).

In yet another particular embodiment, the antenna 104 can be un-insulated and electrically conductive. The antenna may be a plate, a length of wire, or a coil. The location, the orientation, and the physical dimensions of the antenna, such as size, thickness, and number of turns in the coil, can be varied to suit the application and available space.

During an electrostatic event, the antenna 104 can pick up a build-up of electrostatic charge on a chassis of the single housing 114 or in the vicinity of the single housing 114 and couples a voltage to the electrostatic event detector 102. In other words, a capacitive coupling can occur between the electrostatic event detector 102 and the chassis of the single housing 114 through the antenna 104. Capacitive coupling can occur when a charged object (either positively or negatively charged) is placed near a neutral object. The charged object will attract unlike charges to a near surface and repel like charges to a far surface, thus inducing an electrical voltage in the neutral object, such as the antenna 104.

The indication of the electrostatic event 106 may be based on the level of the coupling voltage and may correspond to an amount of electrostatic charge build-up or an amount of electrostatic discharge. The electrostatic event detector 102 may then compare the indication of the electrostatic charge to a threshold and provide an interrupt to the controller 110 to indicate when the electrostatic charge is greater than the threshold.

The controller 110 may selectively initiate a data integrity management process on the memory 112 when an electrostatic event is detected. An electrostatic event may be detected based on the interrupt received from the electrostatic event detector 102. The data integrity management process may include verifying data on the memory 112 and/or determining when data on the memory 112 has been corrupted. The data integrity management process may also include re-writing data to the memory 112 when the data cannot be verified or rewriting the data that has been corrupted. The data integrity management process may also include recovering data corrupted due to the electrostatic event.

The data integrity management process can also include enabling an ESI protection circuit (not shown). The ESD protection circuit may be part of the controller 110, the memory 112, or part of a device including the controller 110. The ESD protection circuit can be any type of ESD protection circuit and the location, the orientation, the physical properties, and the dimensions of the ESD protection circuit can be varied to suit the application. In a particular embodiment, the electrostatic event detector 102, the antenna 104, and/or the ESD protection circuit may be part of the controller 110, the memory 112, or part of the single housing 114. In another particular embodiment, the electrostatic event detector 102, the antenna 104, and/or the ESD protection circuit may be part of a host, such as part of a host controller or other host logic. For example, the antenna 102 may be an antenna of a host or the antenna may be coupled to a host's ESD detection circuit. The ESD protection circuit can be any type of ESD protection circuit and the location, the orientation, the physical properties, and the dimensions of the ESD protection circuit can be varied to suit the application.

Figure 2:
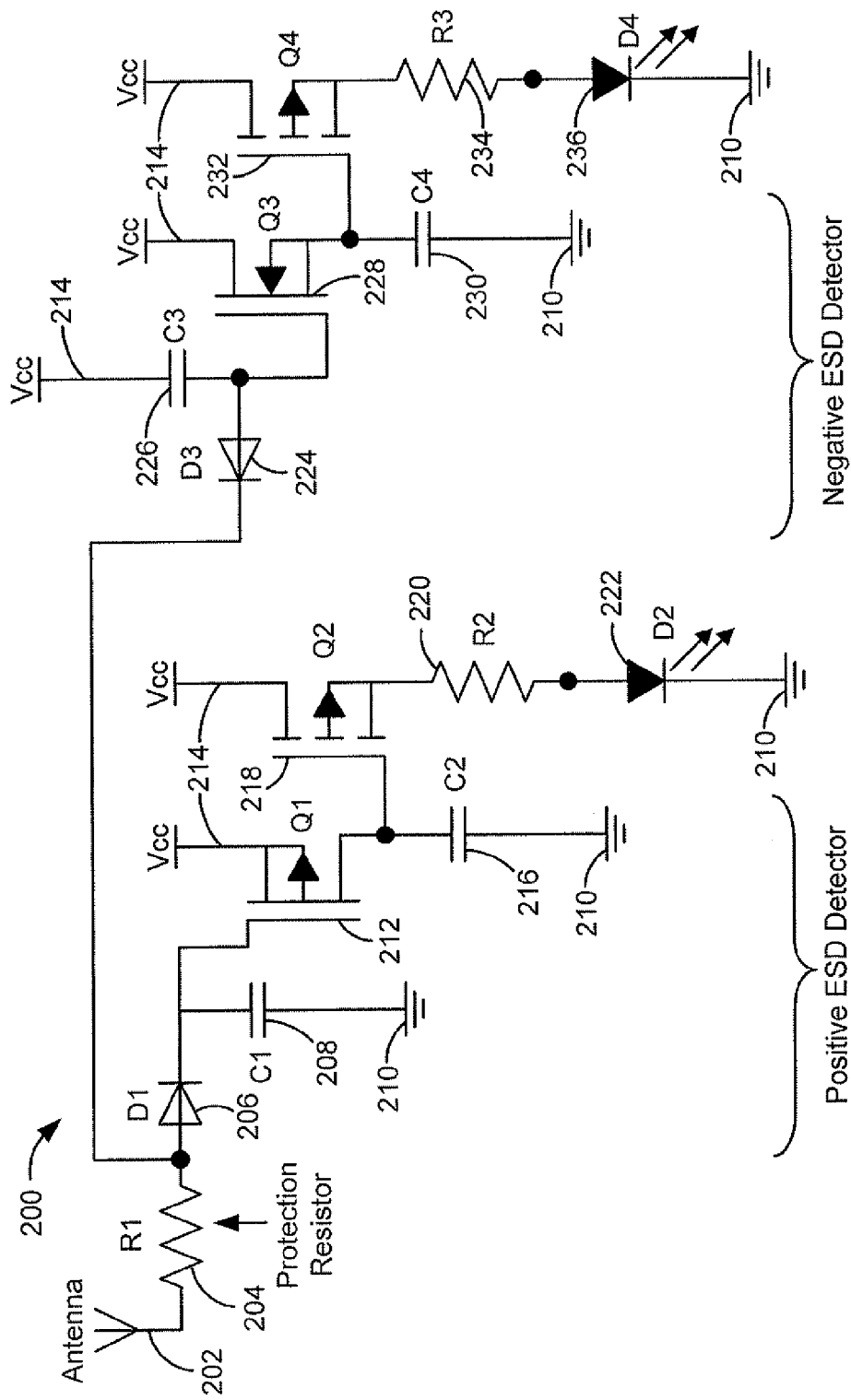
FIG. 2 is a particular illustrative embodiment of a circuit for detecting an electrostatic event.

Referring to FIG. 2, a particular illustrative embodiment of a circuit for detecting an electrostatic event is disclosed and designated 200. The circuit 200 can include an antenna 202 coupled to a first resistor 204 that is coupled to a first diode 206. In a particular embodiment, the first resistor 204 is a protection resistor and may attenuate the current from the antenna 202 and can have a value in the range of several mega ohm. The first resistor 204 can provide protection against the high current that an electrostatic event can generate.

The first diode 206 may be coupled to a first capacitor 208 that is coupled to ground 210. In a particular embodiment, all the capacitors in the circuit 200 may have a value of 33 picofarads (pF). The first diode 206 may also be coupled to the gate of a depletion mode p-type metal-oxide-semiconductor field-effect-transistor (pMOSFET) 212. The depletion mode pMOSFET 212 may have a voltage source (Vcc) 214 coupled to it's source and may have a second capacitor 216 coupled to it's drain. The voltage source 214, or supply voltage, may be in the range of 3 volts to 15 volts. The second capacitor 216 may also be coupled to ground 210. The drain of the depletion mode pMOSFET 212 may also be coupled to the gate of a first enhancement mode pMOSFET 218. The source of the first enhancement mode pMOSFET 218 may be coupled to the voltage source 214 and the drain may be coupled to a second resistor 220. In a particular embodiment, the second resistor 220 may have a value of 270 ohm. The second resistor 220 may be coupled to a first light emitting diode (LED) 222 that is coupled to ground 210.

The circuit 200 may also include a second diode 224 coupled to the first resistor 204. The second diode 224 may be coupled to a third capacitor 226 that is coupled to the voltage source 214. The second diode 224 may also be coupled to the gate of a depletion mode n-type MOSFET (nMOSFET) 228. The depletion mode nMOSFET 228 may have the voltage source (Vcc) 214 coupled to it's source and may have a fourth capacitor 230 coupled to it's drain. The fourth capacitor 230 may also be coupled to ground 210. The drain of the depletion mode nMOSFET 228 may also be coupled to the gate of a second enhancement mode pMOSFET 232. The source of the second enhancement mode pMOSFET 232 may be coupled to the voltage source 214 and the drain may be coupled to a third resistor 234. In a particular embodiment, the third resistor 234 may have a value of 270 ohm. The third resistor 234 may be coupled to a second light emitting diode (LED) 236 that is coupled to ground 210.

During an electrostatic event, the circuit 200 may detect both a positive and a negative electrostatic charge or an electrostatic discharge (ESD). The LEDs 222 and 236 can be used as outputs to indicate a positive electrostatic charge or a negative electrostatic charge, respectively. In a particular embodiment, the LEDs 222 and 236 may be replaced with a logic circuit that can generate a signal indicating a positive electrostatic charge or a negative electrostatic charge, respectively.

The first diode 206 and the second diode 224 can dictate the current flow for charging and discharging the first capacitor 208 and the third capacitor 226, respectively. The depletion-mode pMOSFET 212 and the depletion-mode nMOSFET 228 can be used as detecting transistors for positive electrostatic charge and negative electrostatic charge, respectively. The depletion-mode pMOSFET 212 is turned off when a positive voltage is supplied to its gate. This may occur when the antenna 202 supplies a positive voltage to the first capacitor 208. The depletion-mode nMOSFET 228 is turned off when a negative voltage is supplied to its gate. This may occur when the antenna 202 supplies a negative voltage to third capacitor 226. The first enhancement-mode pMOSFET 218 and the second enhancement-mode pMOSFET 232 can be used as output driver transistors because an enhancement-mode pMOSFET is turned off when positive voltage is supplied at its gate. An enhancement-mode pMOSFET will be turned on when the gate terminal is grounded.

When there is no charge in the first capacitor 208 and the third capacitor 226, there will be no voltage supplied to the gates of the depletion-mode pMOSFET 212 and the depletion-mode nMOSFET 228, thus, both MOSFETs are turned on. Consequently, the first enhancement-mode pMOSFET 218 and the second enhancement-mode pMOSFET 232 are turned off.

When a positive charge build-up is received by the antenna 202, the first capacitor 208 will charge to a positive voltage while the third capacitor is not affected due to the first diode 206 and the second diode 224. The depletion-mode pMOSFET 212 will then be turned off, supplying no voltage to the gate of the first enhancement-mode pMOSFET 218, which will then turn on and the first LED 222 will light up to indicate a positive electrostatic charge event. In a particular embodiment, when the first LED 222 lights up, a logic circuit may generate a signal to indicate an electrostatic event. The signal may be a voltage level to indicate an interrupt to a controller.

When a negative charge is drawn from the antenna 202, the third capacitor 226 charges to a negative voltage while the first capacitor 208 is not affected due to the first diode 206 and the second diode 224. The depletion-mode nMOSFET 228 will then be turned off, supplying no voltage to the gate of the second enhancement-mode pMOSFET 232, which will then turn on and the second LED 236 will light up to indicate a negative electrostatic charge event. In a particular embodiment, when the second LED 236 lights up, a logic circuit may generate a signal to indicate an electrostatic event. The signal may be a voltage level to indicate an interrupt to a controller.

Figure 3:
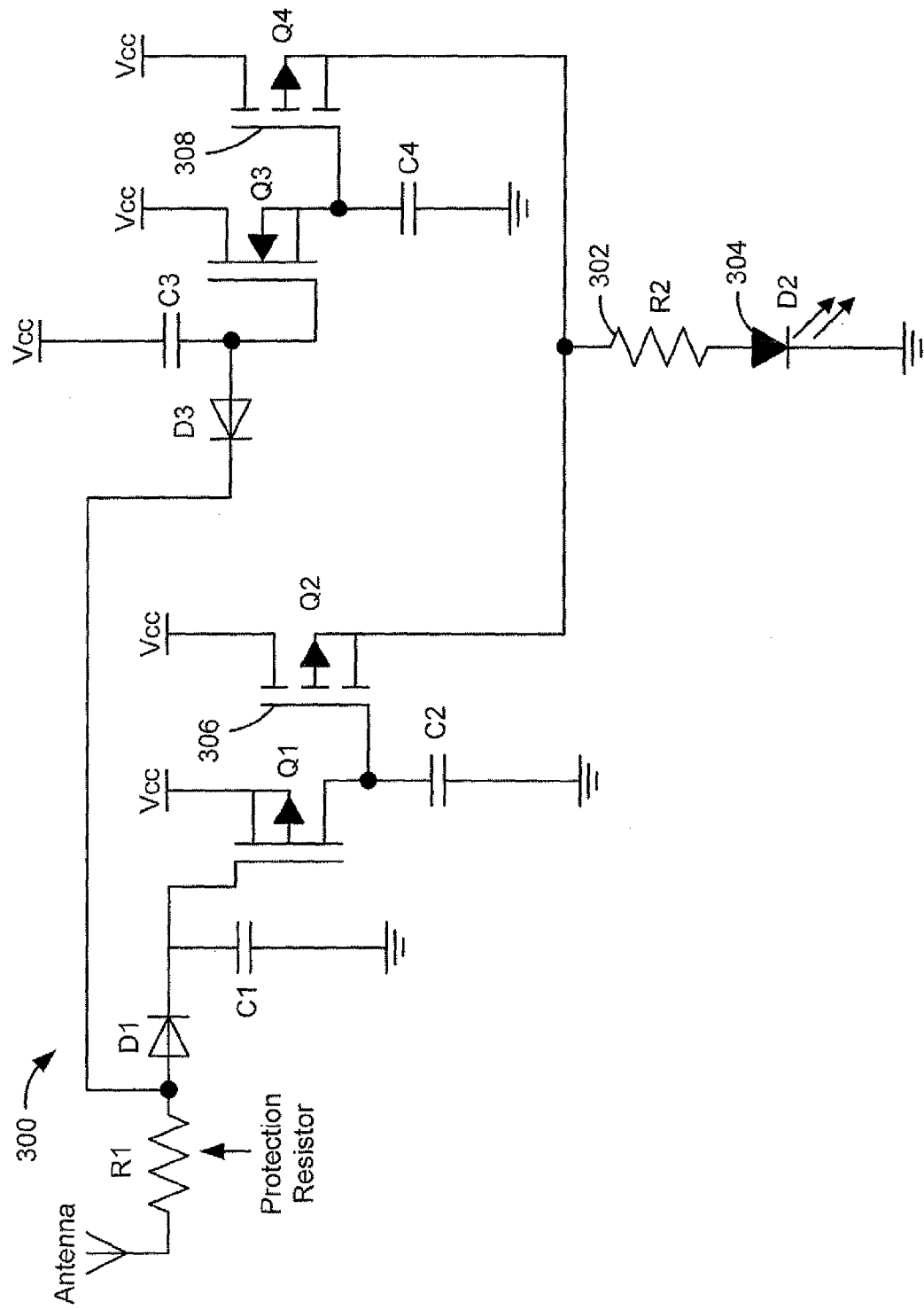
FIG. 3 is another particular illustrative embodiment of a circuit for detecting an electrostatic event.

Referring to FIG. 3, another particular illustrative embodiment of a circuit for detecting an electrostatic event is disclosed and generally designated 300. The circuit 300 may include the elements of the circuit 200 shown in FIG. 2, except that instead of a second output (the second LED 236) there may only be one output, such as the LED 304 coupled to a resistor 302. The resistor 302 is coupled to the drain of a first enhancement-mode pMOSFET 306 and to the drain of a second enhancement-mode pMOSFET 308.

During an electrostatic event, the circuit 300 may detect both a positive and a negative electrostatic charge or an electrostatic discharge (ESD). The LED 304 can be used as an output to indicate an electrostatic event. In a particular embodiment, the LED 304 may be replaced with a logic circuit that can generate a signal indicating an electrostatic event. The logic circuit may generate an output signal at a voltage level to indicate an electrostatic event. The voltage level may trigger an interrupt at a controller.

Figure 4:
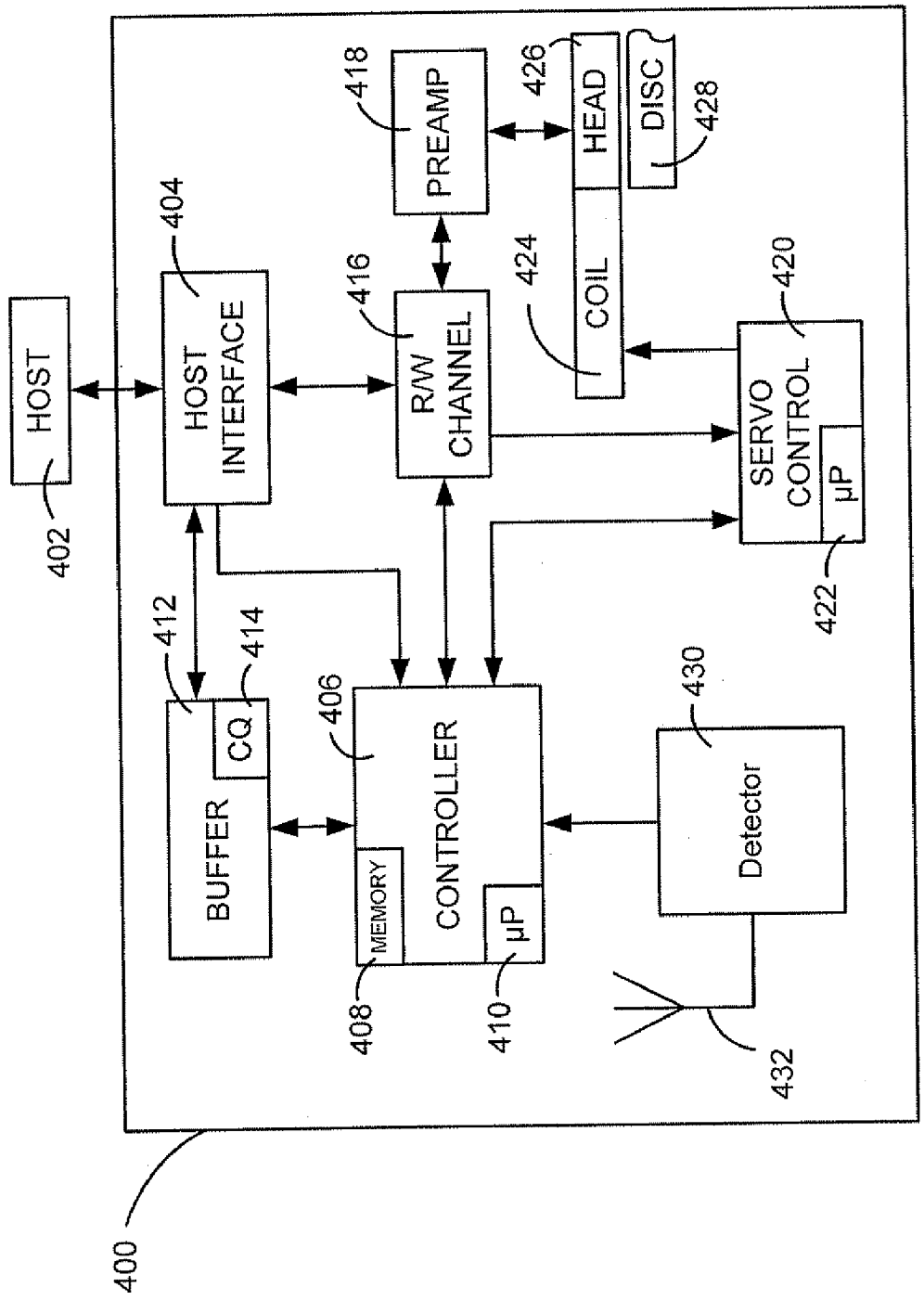
FIG. 4 is a block diagram of a particular illustrative embodiment of a disc drive system including a system for detecting an electrostatic event.

Referring to FIG. 4, a block diagram of a particular illustrative embodiment of a disc drive system including a system for detecting an electrostatic event is disclosed and generally designated 400. FIG. 4 provides a functional block diagram of a disc drive 400. The disc drive 400 can communicate with a host device 402 (such as a cellular phone or portable music player) via a hardware/firmware based interface circuit 404. The disc drive 400 includes a programmable controller 406 with associated memory 408 and a processor 410. The programmable controller 406 may be coupled to a buffer 412. The buffer 412 can temporarily store user data during read and write operations and can include a command queue (CQ) 414 where multiple pending access operations can be temporarily stored pending execution.

FIG. 4 further shows the data storage device 400 to include a read/write (R/W) channel 416 which encodes data during write operations and reconstructs user data retrieved from disc(s) 428 during read operations. A preamplifier/driver circuit (preamp) 418 applies write currents to the head(s) 426 and provides pre-amplification of readback signals.

A servo control circuit 420 uses servo data to provide the appropriate current to the coil 424 to position the head(s) 426. The controller 406 communicates with a processor 422 to move the head(s) 426 to the desired locations on the disc(s) 428 during execution of various pending commands in the command queue 414.

In a particular embodiment, the disc drive 400 can also include an antenna 432 coupled to an electrostatic event detector 430. The electrostatic event detector 430 can be coupled to the controller 406. An electrostatic event may include a build-up of an electrostatic charge or an electrostatic discharge.

During an electrostatic event, the electrostatic event detector 430 may receive an indication of an electrostatic event from the antenna 432. The antenna 432 can provide a voltage to an input of the electrostatic event detector 430. The indication of the electrostatic event may be based on the level of the coupling voltage and may correspond to an amount of electrostatic charge build-up or an amount of electrostatic discharge. The electrostatic event detector 430 may compare the indication of the electrostatic charge to a threshold and provide an interrupt to the controller 406 to indicate when the electrostatic charge is greater than the threshold.

The controller 406 may selectively initiate a data integrity management process when an electrostatic event is detected. The data integrity management process may be performed on the memory 408, the buffer 412, the disc(s) 428, another memory coupled to the disc drive 400, or any combination thereof. When an electrostatic event is detected may be based on the interrupt received from the electrostatic event detector 430. The data integrity management process may include verifying data and/or determining when data has been corrupted. The data integrity management process may also include re-writing data when the data cannot be verified or rewriting the data that has been corrupted. The data integrity management process may also include recovering data corrupted due to the electrostatic event.

The data integrity management process can also include enabling an ESD protection circuit (not shown). The ESD protection circuit may be part of the controller 406, the electrostatic event detector 430, the disc drive 400, or part of the host 402, such as part of a host controller or other host logic. The ESD protection circuit can be any type of ESD protection circuit and the location, the orientation, the physical properties, and the dimensions of the ESD protection circuit can be varied to suit the application.

In another particular embodiment, the electrostatic event detector 430, the antenna 432, and/or the ESD protection circuit may be part of the host 402, such as part of a host controller or other host logic. For example, the antenna 432 may be an antenna of the host 402 or the antenna may be coupled to an ESD detection circuit of the host 402. The electrostatic event detector can be any type of electrostatic event detector circuit and the location, the orientation, the physical properties, and the dimensions of the electrostatic event detector circuit can be varied to suit the application. In yet another particular embodiment, the electrostatic event detection may be monitored by the host 402 and communicated to a device, such as the disc drive 400, through a dedicated path or interface protocol.

Figure 5:
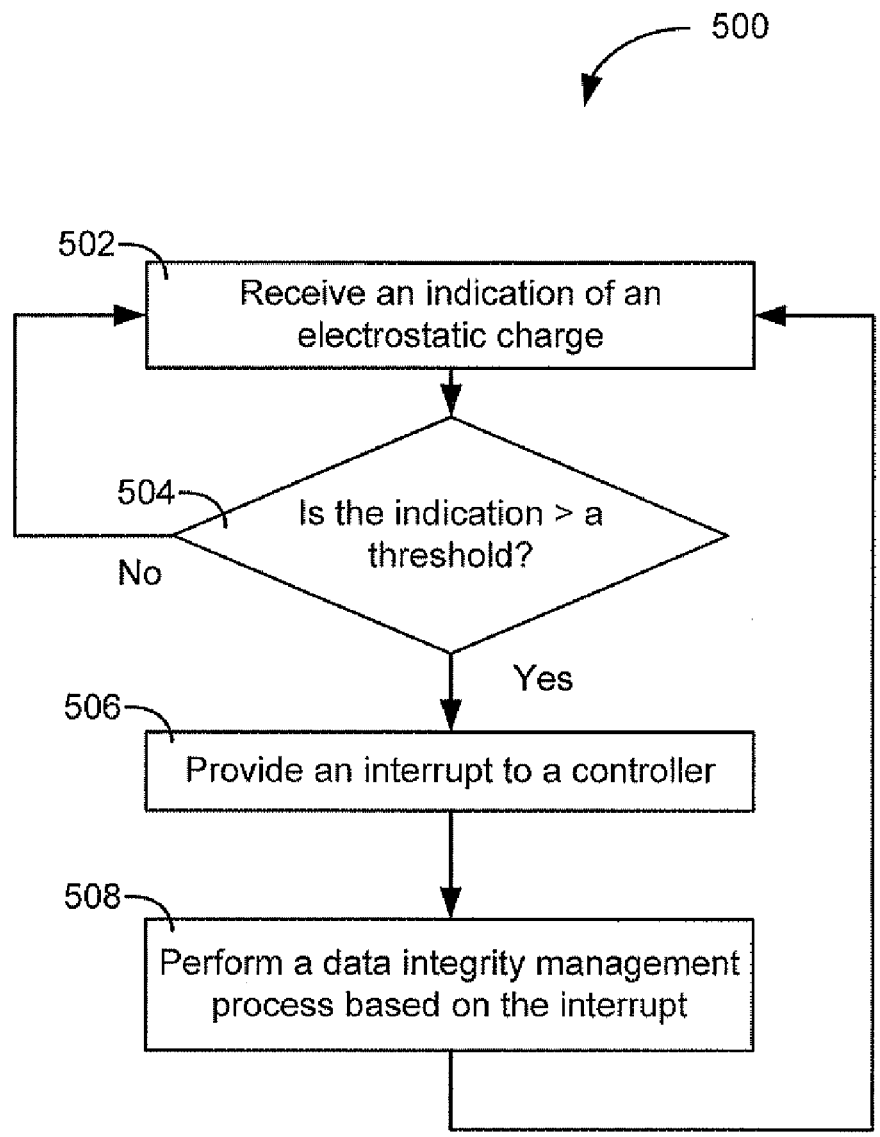
FIG. 5 is a flow diagram of a particular illustrative embodiment of a method of data integrity management responsive to an electrostatic event.

Referring to FIG. 5, a particular illustrative embodiment of a method of detecting an electrostatic charge at a data storage device is disclosed and generally designated 500. The method 500 may be used to monitor an electronic device having a data storage medium for an electrostatic event. The method 500 includes receiving an indication of an electrostatic event, at 502. The indication of the electrostatic event may be based on a voltage and may correspond to an amount of electrostatic charge build-up or an amount of electrostatic discharge.

The indication of the electrostatic event may then be compared to a threshold, at 504. When the indication is not greater than the threshold, the method 500 may continue monitoring for an electrostatic event, at 502. When the indication is greater than the threshold, the method 500 may provide an interrupt to a controller to signify an indication that the electrostatic event is greater than the threshold, at 506. The steps 502, 504, and 506 may be performed by an electrostatic event detection circuit, such as the detection circuits discussed with respect to FIG. 2 and FIG. 3.

The method 500 may selectively initiate a data integrity management process based on the interrupt, at 508. The data integrity management process may include verifying data and/or determining when data has been corrupted. The data integrity management process may also include re-writing data when the data cannot be verified or rewriting the data that has been corrupted. The data integrity management process may also include recovering data corrupted due to the electrostatic event. When the data integrity management process is complete or while the data integrity management process is being executed, the method 500 may continue monitoring the electronic device, at 502.

Figure 6:
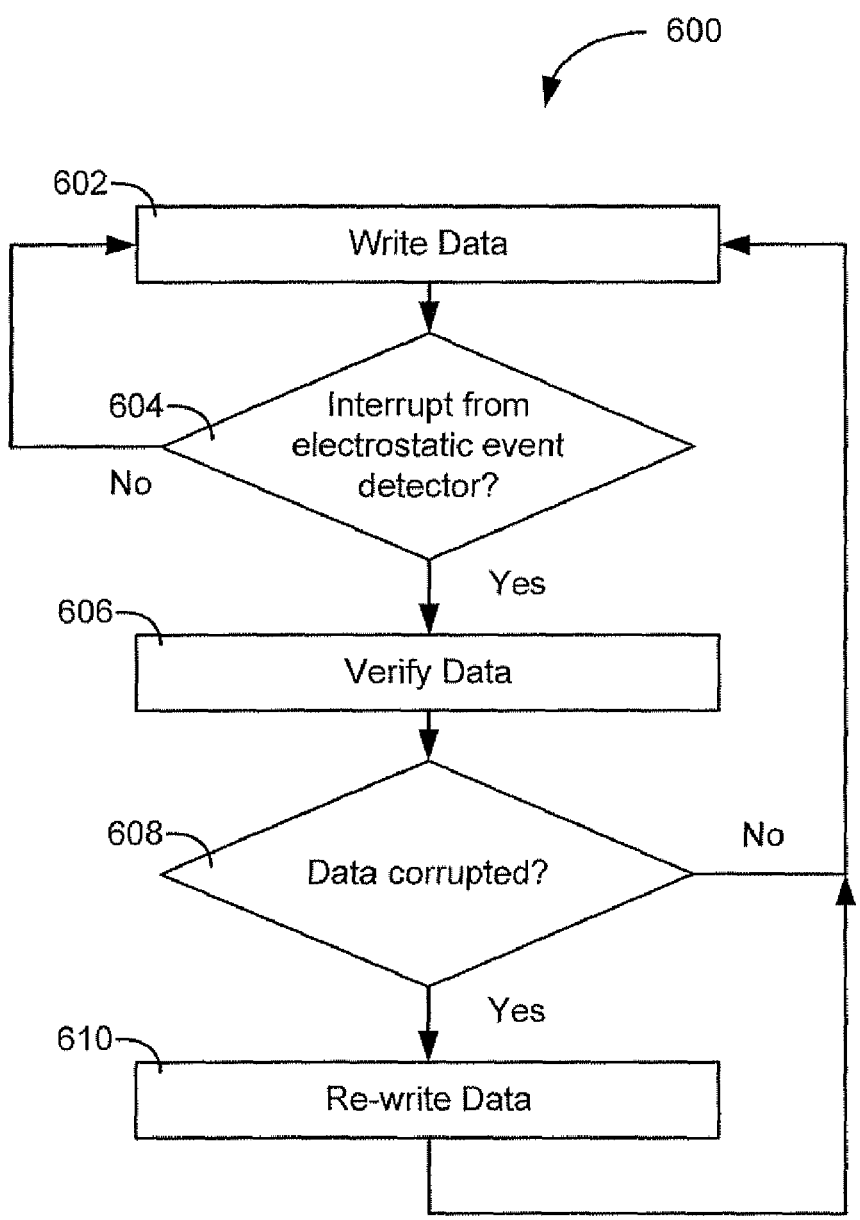
FIG. 6 is a flow diagram of another illustrative embodiment of a method of data integrity management responsive to an electrostatic event.

Referring to FIG. 6, another illustrative embodiment of a method of detecting an electrostatic event at a data storage device is disclosed and generally designated 600. The method 600 may be used by a device that stores data, such as the disc drive 400 shown in FIG. 4. The method 600 may include writing data to a data storage medium (i.e. memory), at 602. The method 600 may also include determining when an interrupt from an electrostatic event detector has been received, at 604. When an interrupt is not detected, the device may continue storing data under normal operation, at 602.

When an interrupt from the electrostatic event detector is received, the method 600 may verify data that was previously written, at 606. The method 600 may verify the data by reading the data from the data storage medium and comparing that to a copy of the data stored in another memory. The method 600 may also include determining if the data has been corrupted, at 608. When the data has been corrupted, the method 600 may re-write the data, at 610. The method 600 may then return to storing data under normal operation, at 602.

In a particular embodiment, when the data has not been corrupted, the method 600 may continue storing data under normal operation, at 602. When data has been corrupted, the method 600 may also include performing data correction or recovery procedures. The data correction may include recovering data using a data redundancy scheme, parity bits, turbo codes, Viterbi algorithms, a Reed-Solomon code, a Reed-Muller code, or any other available data correction method.

In accordance with various embodiments, the methods described herein may be implemented as one or more software programs running on a computer processor or controller, such as the controller 110 or the controller 406. In accordance with another embodiment, the methods described herein may be implemented as one or more software programs running on a host device, such as a PC that is using a disc drive. Dedicated hardware implementations including, but not limited to, application specific integrated circuits, programmable logic arrays and other hardware devices can likewise be constructed to implement the methods described herein.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be reduced. Accordingly, the disclosure and the figures are to be regarded as illustrative rather than restrictive.

One or more embodiments of the disclosure may be referred to herein, individually and/or collectively, by the term "invention" merely for convenience and without intending to limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method comprising:
    monitoring an electronic device having a data storage medium for an electrostatic event;
    selectively performing a data integrity management process on the data storage medium when the electrostatic event is detected wherein the data integrity management process comprises re-writing data on the data storage medium when the data cannot be verified; and
    enabling an electrostatic discharge protection circuit in the electronic device.

2. The method of claim 1 wherein the data integrity management process includes verifying data on the data storage medium.

3. The method of claim 1 wherein the data integrity management process includes determining when data on the data storage medium has been corrupted.

4. The method of claim 1 wherein the data integrity management process includes recovering data corrupted due to the electrostatic event.

5. The method of claim 1 wherein the electrostatic event is selected from one of a build-up of electrostatic charge and an electrostatic discharge (ESD).

6. A method comprising:
    monitoring an electronic device having a data storage medium for an electrostatic event; and
    selectively performing a data integrity management process that includes determining if data has been written to the data storage medium when the electrostatic event is detected wherein the data integrity management process comprises re-writing data on the data storage medium.

7. A method comprising:
    monitoring an electronic device having a data storage medium for an electrostatic event;
    selectively performing a data integrity management process on the data storage medium when the electrostatic event is detected; and
    rewriting data on the data storage medium based on the data integrity management process.

8. A device comprising:
an electrostatic charge detection circuit;
an antenna coupled to the electrostatic discharge circuit to provide a voltage to an input of the electrostatic charge detection circuit, the voltage corresponding to an amount of electrostatic charge build-up;
a memory;
a controller operably coupled to the memory and the electrostatic charge detection circuit, the controller operable to selectively initiate a data integrity management process on the memory when an electrostatic event is detected, wherein the data integrity management process comprises rewriting data on the memory.

9. The device of claim 8 wherein the electrostatic charge detection circuit can detect a positive electrostatic charge and a negative electrostatic charge.

10. The device of claim 8 wherein the data integrity management process further comprises enabling an electrostatic discharge protection circuit in the device.

11. The device of claim 8 wherein the electrostatic charge detection circuit further comprises a logic circuit operable to generate a signal indicating a positive electrostatic charge or a negative electrostatic charge.

12. A device comprising:
an electrostatic charge detection circuit;
a memory comprising solid state memory;
a controller operably coupled to the memory and the electrostatic charge detection circuit, the controller operable to selectively initiate a data integrity management process on the memory when an electrostatic event is detected, wherein the data integrity management process comprises rewriting data on the memory when the data cannot be verified.

13. A device comprising:
an electrostatic charge detection circuit;
a memory; and
a controller operably coupled to the memory and the electrostatic charge detection circuit, the controller operable to selectively initiate a data integrity management process on the memory when an electrostatic event is detected by the electrostatic charge detection circuit, the data integrity management process comprising verifying data on the memory and re-writing the data on the memory when the data can not be verified.

\* \* \* \* \*